United States Patent [19]
Collins et al.

[11] Patent Number: 5,375,696
[45] Date of Patent: * Dec. 27, 1994

[54] HIGH SPEED LINESHAFT-DRIVEN ACCUMULATING CONVEYOR

[75] Inventors: Ellsworth H. Collins, Mt. Washington; William A. Fultz; James F. Mattingly, both of Louisville, all of Ky.

[73] Assignee: The Interlake Companies, Inc., Shepherdsville, Ky.

[*] Notice: The portion of the term of this patent subsequent to Feb. 22, 2011 has been disclaimed.

[21] Appl. No.: 168,474

[22] Filed: Dec. 16, 1993

Related U.S. Application Data

[63] Continuation-in-part of Ser. No. 14,378, Feb. 5, 1993, Pat. No. 5,287,956.

[51] Int. Cl.5 .............................................. B65G 13/06
[52] U.S. Cl. ................................ 198/781; 198/791
[58] Field of Search ............................... 198/781, 791

[56] References Cited

U.S. PATENT DOCUMENTS

| | | |
|---|---|---|
| 3,124,234 | 3/1964 | Mician . |
| 3,225,893 | 12/1965 | Currie . |
| 3,612,248 | 10/1971 | Wallis . |
| 3,718,248 | 2/1973 | Muller . |
| 3,768,630 | 10/1973 | Inwood et al. . |
| 4,103,769 | 8/1978 | Jorgensen ........................ 198/781 |
| 4,109,783 | 8/1978 | Vogt ................................ 198/781 |
| 4,164,998 | 8/1979 | DeGood et al. ................. 198/781 |
| 4,193,492 | 3/1980 | Hammond ...................... 198/781 |
| 4,344,527 | 8/1982 | Vogt et al. ...................... 198/781 |
| 4,473,149 | 9/1984 | Vogt et al. ...................... 198/781 |
| 4,753,339 | 6/1988 | Vogt et al. ...................... 198/781 |
| 4,815,588 | 3/1989 | Katsuragi et al. ............... 198/781 |
| 5,038,922 | 8/1991 | Collins et al. ................... 198/781 |

FOREIGN PATENT DOCUMENTS

| | | |
|---|---|---|
| 2380963 | 8/1978 | France . |
| 2018213 | 6/1979 | United Kingdom . |
| 1561373 | 2/1980 | United Kingdom . |
| PCT/US91/05706 | 3/1992 | WIPO . |

Primary Examiner—Cheryl L. Gastineau
Attorney, Agent, or Firm—Camoriano & Smith

[57] ABSTRACT

The rollers of a live roller conveyor are driven by drive wheels, which are driven from a driveshaft extending along the conveyor. When the drive wheels and their respective conveyor rollers are in contact with each other, the drive wheels cause the conveyor rollers to rotate. When the drive wheels and conveyor rollers are out of contact, the rollers are not driven and can accumulate product. Relative motion between the drive wheels and the conveyor rollers causes the drive to be engaged and disengaged.

13 Claims, 12 Drawing Sheets

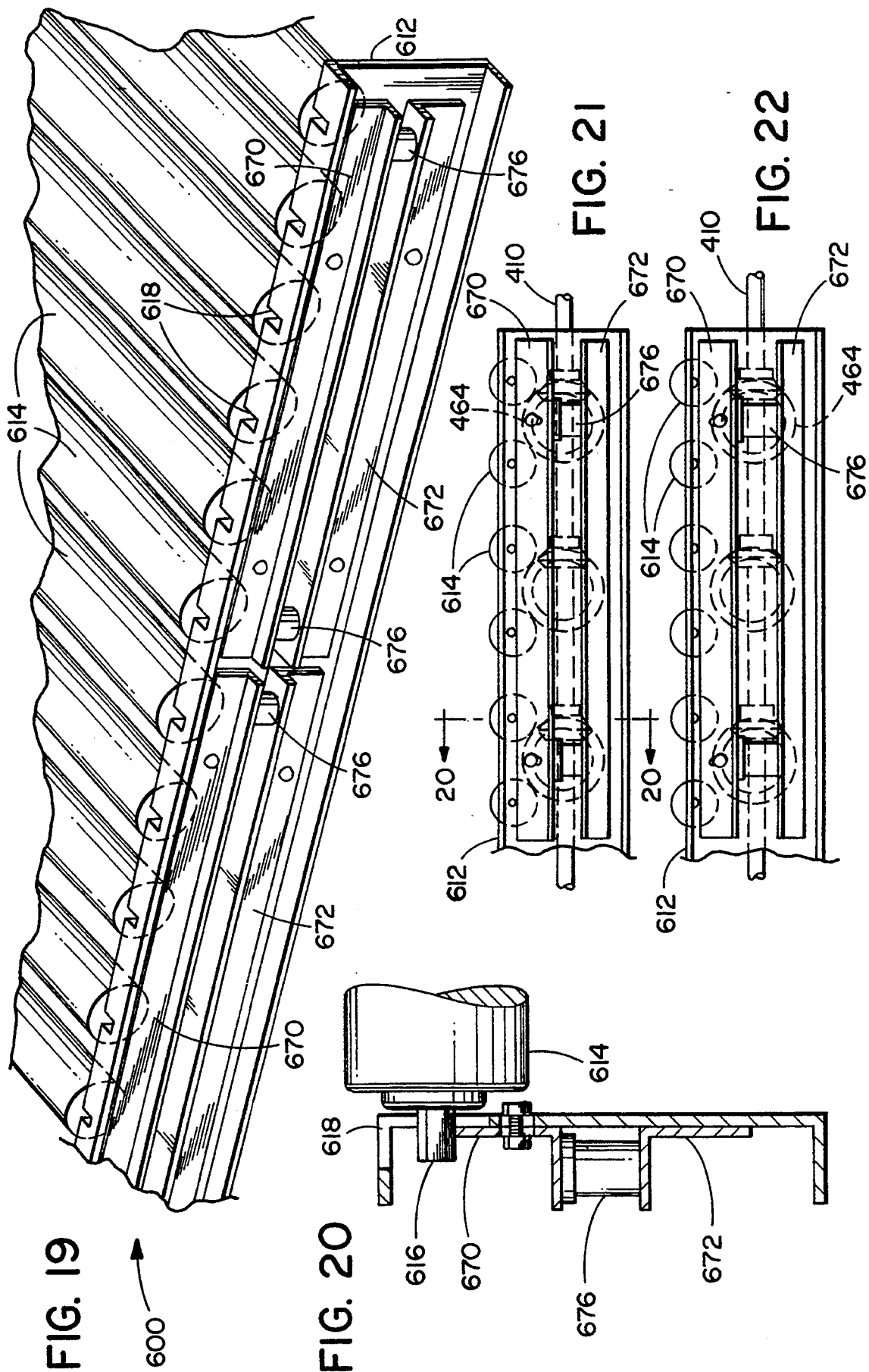

HIGH SPEED LINESHAFT-DRIVEN ACCUMULATING CONVEYOR

This is a continuation-in-part of U.S. patent application Ser. No. 08/014,378 filed Feb. 5, 1993, "HIGH SPEED CONVEYOR WITH MOVABLE DRIVE WHEEL", U.S. Pat. No. 5,287,956. The present invention relates to conveyors driven by a drive shaft extending along the conveyor.

BACKGROUND OF THE INVENTION

The primary type of driveshaft-driven conveyor used in the industry uses O-rings, which wrap around spools mounted on the drive shaft and around the conveyor rollers in order to drive the rollers as the drive shaft rotates. This type of conveyor has a speed limitation, because the O-rings may begin to slip at high speeds. It also is difficult to replace the O-rings when they break. It is also very difficult to stop portions of the 0-ring driven conveyor for accumulation.

Some conveyors are known which use a drive shaft and drive by a means other than O-rings. For example, it is known to put a gear on the driveshaft and a gear on the conveyor roller and have a direct drive from the driveshaft to the roller. This arrangement cannot readily be put into the accumulation mode, because, whenever the driveshaft is rotating, all the conveyor rollers are rotating.

Chain-driven roller conveyors are known, but they also have speed limitations, can be very noisy, and require substantial maintenance. Chain-driven conveyors are not readily reversible in direction, because a chain must always be pulled, not pushed.

SUMMARY OF THE INVENTION

The present invention provides a conveyor with all the advantages of a driveshaft-driven conveyor, such as quiet operation, plus it can readily be put into an accumulation mode, in which portions of the conveyor can be stopped and started for accumulating products on the conveyor, and it has far fewer maintenance problems than standard O-ring, lineshaft conveyors and far fewer maintenance problems than chain-driven conveyors.

The present invention provides a much higher conveying speed than other accumulating conveyors, with a maximum speed of about 500 feet per minute, as compared with 250 feet per minute for other known accumulating conveyors.

The present invention provides a simple, inexpensive conveyor design, which is easy to assemble and to maintain.

The present invention provides a conveyor which is reversible in two ways. It can be driven forward and backward simply by reversing the direction of rotation of the driveshaft. It also can be installed on the left or right side of the conveyor without changing any of the components.

The present invention provides a positive drive and eliminates the problems of replacing O-rings and the noise and maintenance problems of chain drives.

The present invention provides an arrangement in which the drive shaft and drive mechanism can be assembled onto one siderail and can be stocked in that manner to be used as standard, off-the-shelf stock for any width of conveyor. This stocked length of siderail and drive can then be combined with a second standard siderail and with cross-members of any width to make any width of conveyor. This greatly simplifies assembly and stocking requirements from other known conveyors.

BRIEF DESCRIPTION OF THE DRAWINGS

FIG. 19 is a perspective view of a fourth embodiment of the invention;

FIG. 20 is a broken away sectional view of the left portion of the conveyor of FIG. 19;

FIG. 21 is a left side view of the conveyor of FIG. 19 when it is in the driving position;

FIG. 22 is the same view as FIG. 21 but with the conveyor in the accumulating position.

DESCRIPTION OF THE PREFERRED EMBODIMENTS

Figure 1:
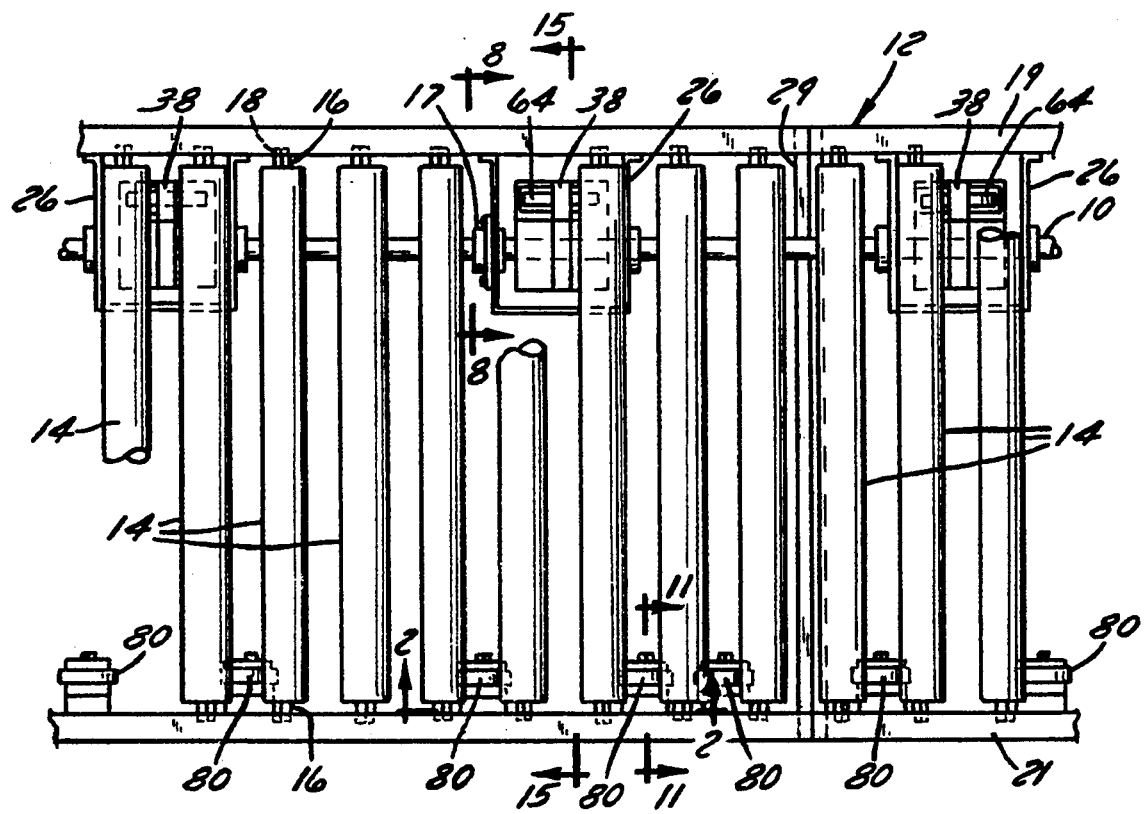
FIG. 1 is a schematic plan view of a first embodiment of a conveyor made in accordance with the present invention.

As shown in FIG. 1, the driveshaft 10 extends along the length of the conveyor frame 12. The driveshaft 10 is driven by a motor (not shown), and the direction of rotation of the driveshaft can be reversed simply by changing the side of the motor to which the negative electrical lead is attached, which will control the direction in which the conveyor transports articles.

Conveyor rollers 14 are mounted on the conveyor frame 12. Each roller 14 has hexagonally-shaped shaft ends 16 which mount into hexagonally-shaped holes 18 on the left and right siderails 19, 21 of the conveyor frame 12, and the body of the roller 14 is freely rotatable relative to the shaft ends.

At intervals along the left siderail 19 are mounted drive gear support boxes 26. Each drive gear support box 26 houses a drive gear 20, which is mounted on the driveshaft 10. In FIG. 1, three of the support boxes 26 are shown. It is anticipated that there will be one drive gear 20 for every 30 inches of conveyor length. The drive gear 20 and the rest of the drive mechanism are shown in more detail in FIGS. 3–10. Looking now at FIG. 5, it can be seen that, on the front side of each drive gear 20 are radially-extending, backwardly-tapered teeth 22, and, molded to the inside of each drive gear 20 is a non-cylindrical core 24 (shown in FIG. 5), which mates with the non-cylindrical outside surface of the pinion adapter 23 and which provides a good wear surface on the back side of the drive gear 20 for contacting the housing thrust washer 68. It may be preferable to mold the drive gear 20 of a wear-resistant material which would permit the core 24 to be eliminated. The pinion adapter 23 is fixed to the drive shaft 10 by means of set screws (not shown).

It will be understood that the drive gear 20 can float axially relative to the driveshaft 10 by sliding axially along the pinion adapter 23 but that the drive gear 20 is driven whenever the driveshaft is driven. The driveshaft 10 drives the drive gear 20 by driving the pinion adapter 23, which is fixed to the drive shaft 10, and which mates with the non-cylindrical inner surface of the drive gear 20, thereby driving the drive gear 20.

Figure 7:
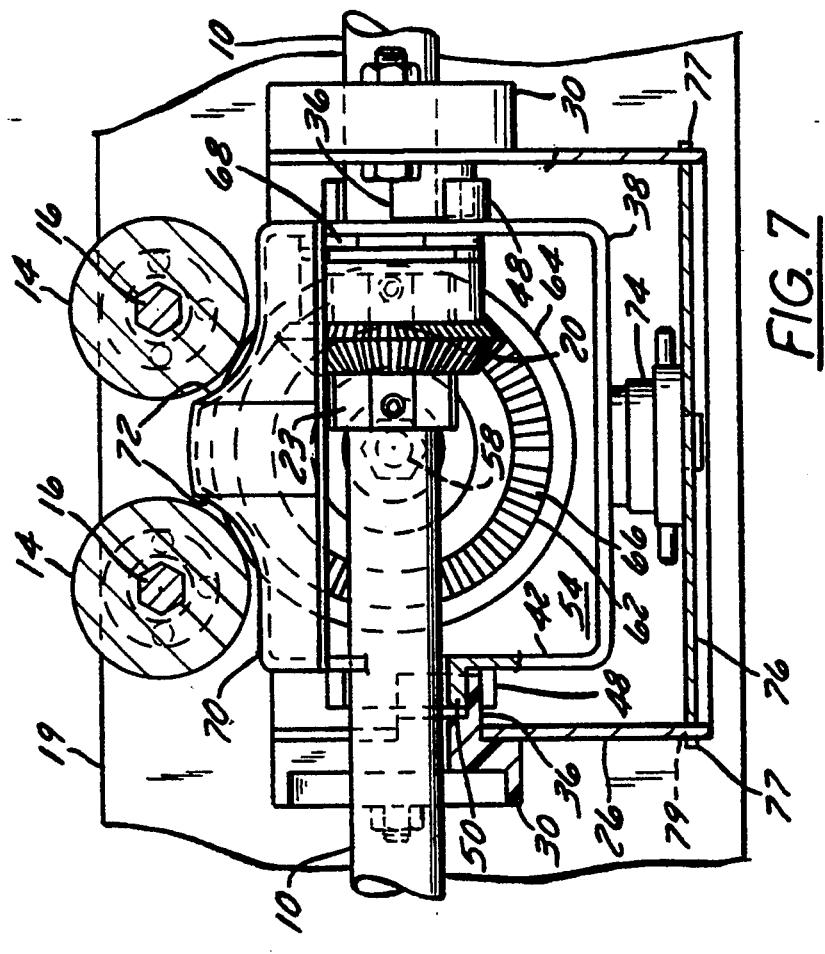
FIG. 7 is a right side sectional view of one of the drive portions shown in FIG. 1.
Figure 10:
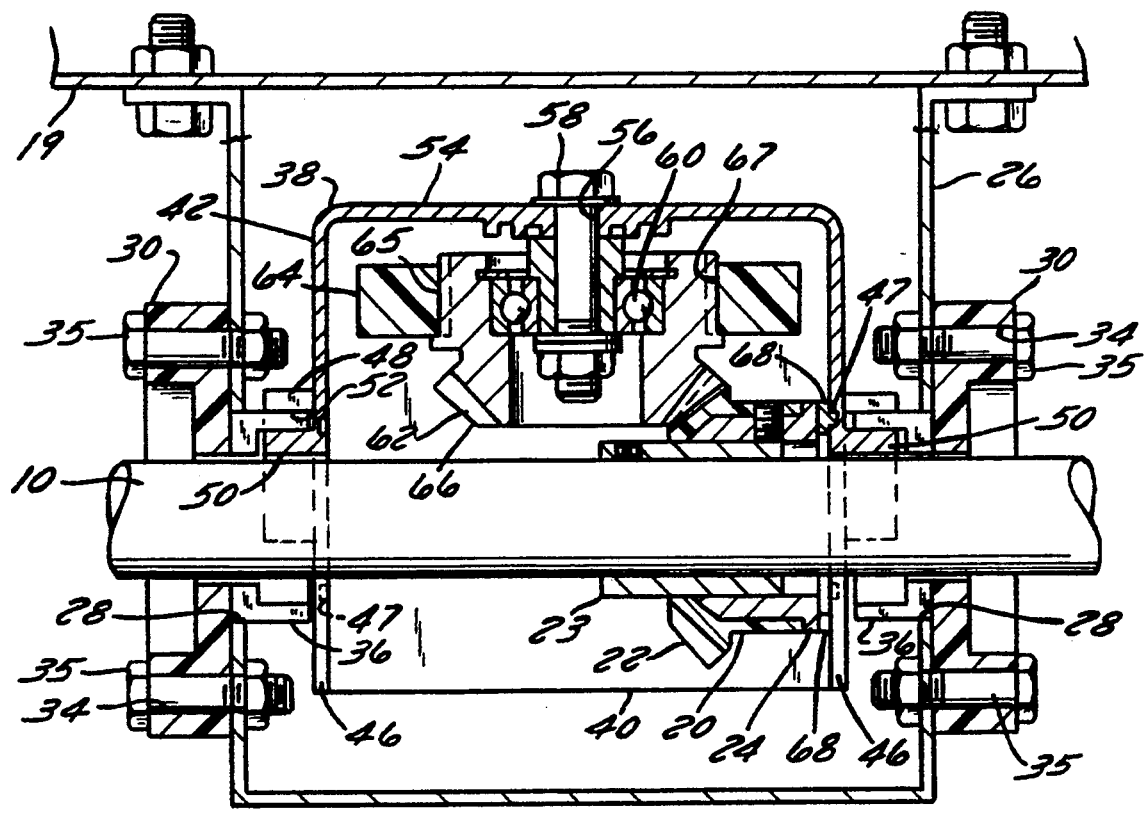
FIG. 10 is a top sectional view of one of the drive portions of FIG. 1.

The support bracket or box 26 has an open top and upwardly-opening U-shaped cut-outs 28 in its front and back faces to permit the driveshaft 10 to extend through the support box 26 without contacting the support box 26. When the drive gear 20 is mounted over the driveshaft 10 and the support box 26 is mounted on the siderail, the drive gear 20 lies inside its respective support box 26, as can be seen in FIGS. 7 and 10.

Referring again to FIG. 5, housing supports 30 are located at each of the U-shaped cut-outs 28 of the box 26. The housing supports 30 have ears 32 with holes 34 for fastening the housing supports 30 to the support box 26 by means of bolts 35 (the bolts 35 are shown best in FIG. 10). Each housing support 30 also has a projection 36 on one side, which is shaped as a portion of a cylinder, covering approximately 180 degrees, which projects through its respective U-shaped cut-out in the support box 26 when the housing support 30 is mounted on the box 26. The inside diameter of the projection 36 is larger than the diameter of the driveshaft 10, so the driveshaft 10 passes through the projections 36 of the housing supports 30 with a clearance fit. The wall thickness of the projection 36 is preferably about 5/32 of an inch. Each housing support 30 also defines an upwardly-opening U-shaped cut-out 37, which permits the driveshaft 10 to be dropped down into the box 26 from the top and to extend through the housing supports 30 with a clearance fit.

Inside the support bracket or box 26 is mounted a housing 38, which is pivotably supported by the housing supports 30 of the box 26. The housing 38 has an open side 40, and the forward and rear faces 42, 44 of the housing 38 have horizontally-oriented U-shaped cut-outs 46, which open into the open side 40. These U-shaped cut-outs 46 are also large enough that the driveshaft 10 passes through them with a clearance fit.

At each of the U-shaped cut-outs 46 of the housing 38 is a pair of outwardly-projecting partial cylinders 48, 50, with a gap 52 defined between the partial cylinders 48, 50 for receiving the respective projection 36 of the housing support 30. These outwardly-projecting partial cylinders 48, 50 are preferably molded as an integral part of the housing 38. As shown best in FIG. 4, the inner partial cylinder 50 extends about 270 degrees, and the outer partial cylinder 48 extends about 90 degrees.

Figure 4:
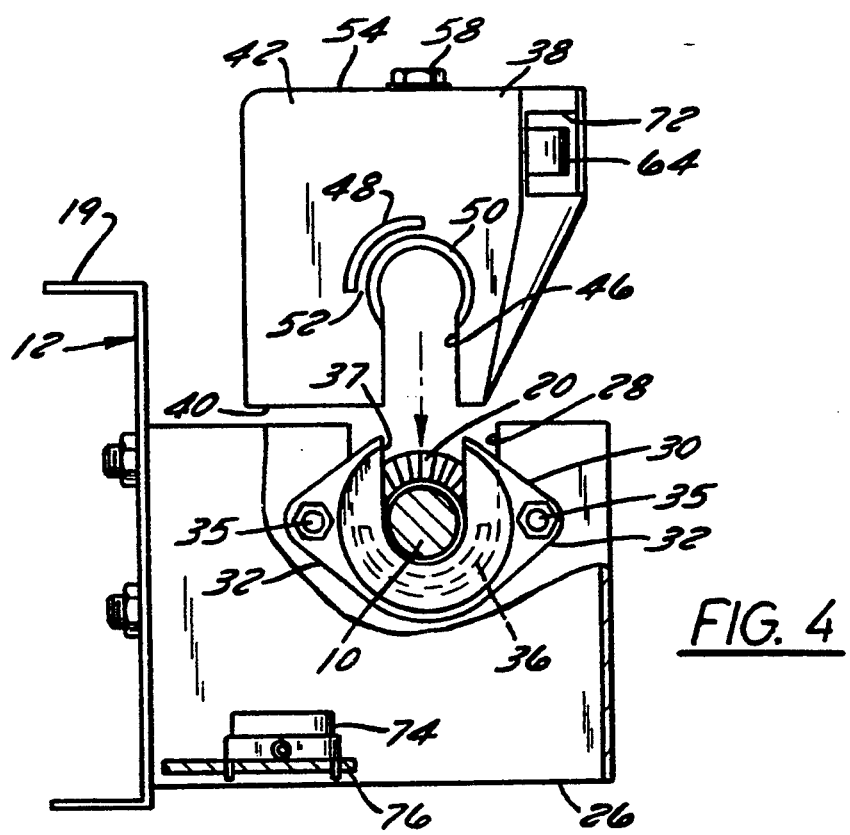
FIG. 4 is a broken-away front sectional view of one of the drive portions of FIG. 1.

FIG. 4 shows how the housing 38 is mounted onto the support box 26. First the housing 38 is rotated 90 degrees, until the open side 40 faces downwardly as shown in FIG. 4. Then, the housing 38 is shifted downward until the driveshaft 10 enters the U-shaped cut-outs 46 in the housing 38. Then, the housing is rotated 90 degrees back to its normal position, with the cylindrical projection 36 of each of the housing supports 30 entering the space or gap 52 between the respective partial cylinders 48, 50 on the end of the housing 38. This locks the housing 38 in place so that it can shift axially a small distance inside the support box 26, moving with the drive gear 20, and it can rotate relative to the driveshaft 10, but it cannot move vertically or shift left or right relative to the driveshaft.

The wall 54 of the housing 38 which lies opposite the open face 40 defines a central hole 56, which receives a mounting bolt 58. On the mounting bolt 58 is mounted a bearing 60. A driven gear 62 is mounted on the bearing 60. On the forward face of the driven gear 62 are radially-extending, rearwardly-tapered teeth 66, which mesh with the teeth 22 of the drive gear 20. From the moment the housing 38 is mounted on the support box 26, the drive gear 20 and the driven gear 62 are meshed, and they remain meshed as long as the housing 38 is installed on the support box or bracket 26.

Figures 5, 6:
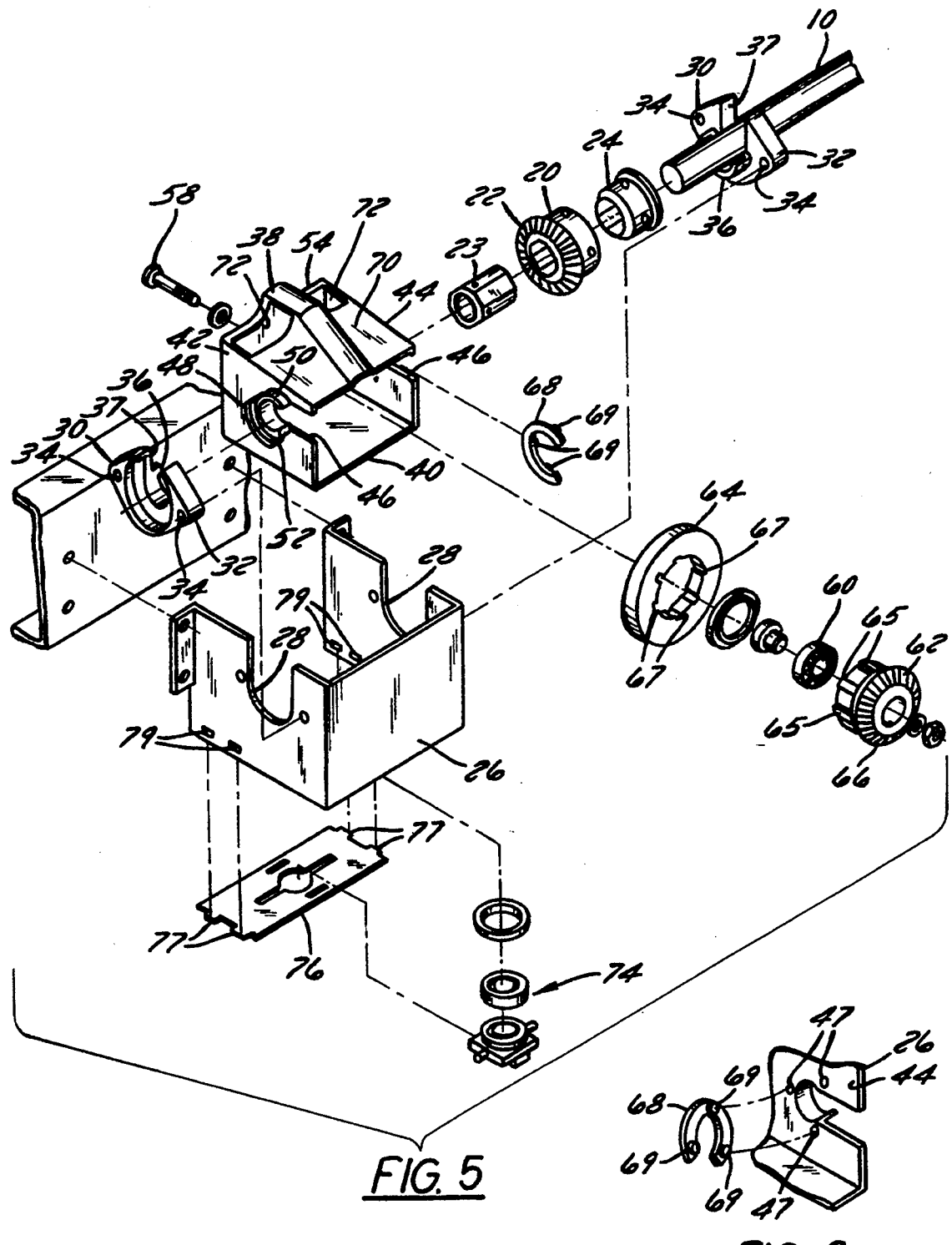
FIG. 5 is an exploded perspective view of one of the drive portions shown in FIG. 1.
FIG. 6 is a broken-away exploded perspective view of the portion of the driven gear housing of FIG. 5 which receives the thrust washer.
Figure 23:
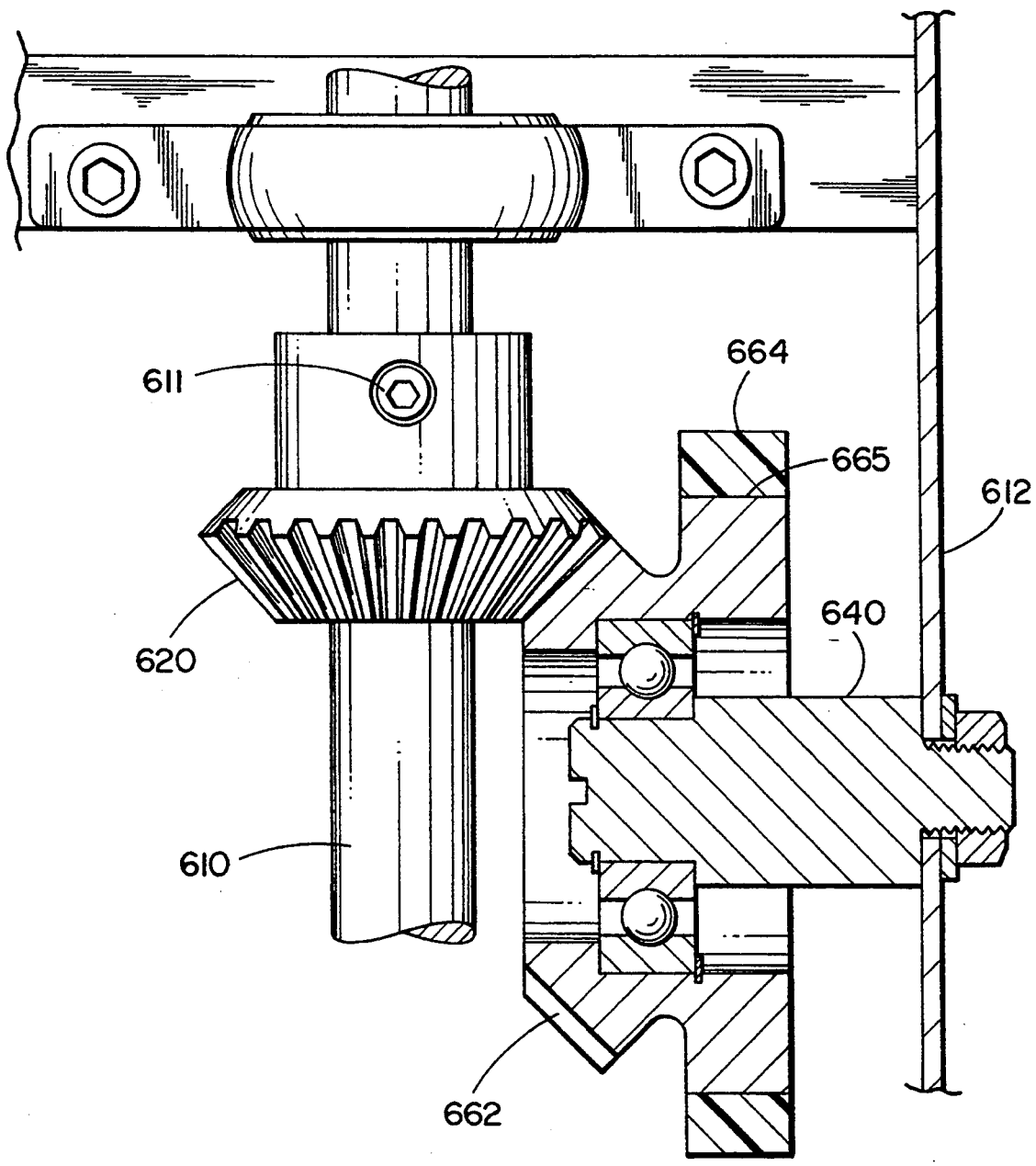
FIG. 23 is a top view partially in section of a portion of the conveyor of FIG. 19, showing the drive mechanism.

A drive wheel or tire 64 is mounted on the back of the driven gear 62, with a non-cylindrical mating connection between the driven gear 62 and the drive tire 64. As shown in FIG. 5, the back portion of the driven gear 62 has a plurality of ridges 65 in its outer surface, and the inner surface of the drive tire 64 has corresponding indentations 67, which mate with the ridges 65. It may be preferable to mold the driven gear 62 with a drive wheel on it as shown in FIG. 23.

A housing thrust washer 68 has projecting feet 69, which snap through holes 47 on the inside of the housing 38 at the U-shaped cut-out 46 on the back face 44 of the housing 38 as shown in FIG. 6. The thrust washer 68 could be snapped into holes 47 in the front face 42 of the housing 38 instead, if the drive gear 20 were to be mounted in the opposite direction. The thrust washer 68 provides a wear surface against which the rear of the core 24 of the drive gear 20 can push.

Figure 2:
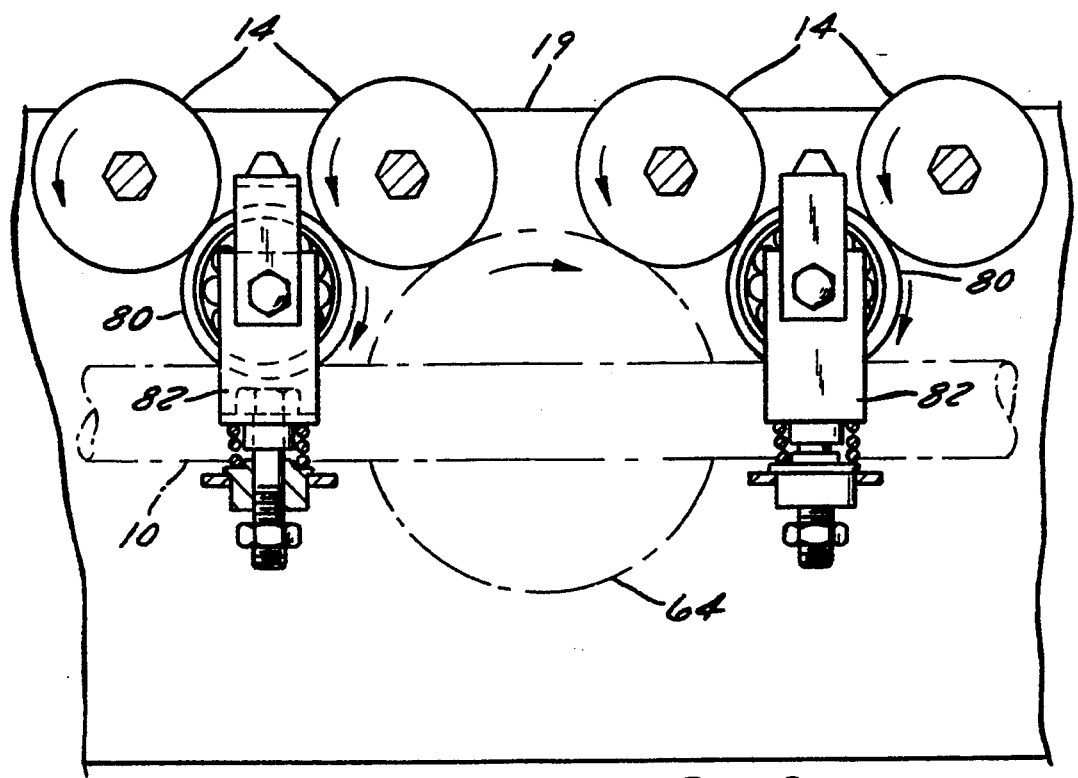
FIG. 2 is a schematic right side sectional view taken along the section 2—2 of FIG. 1.
Figure 3:
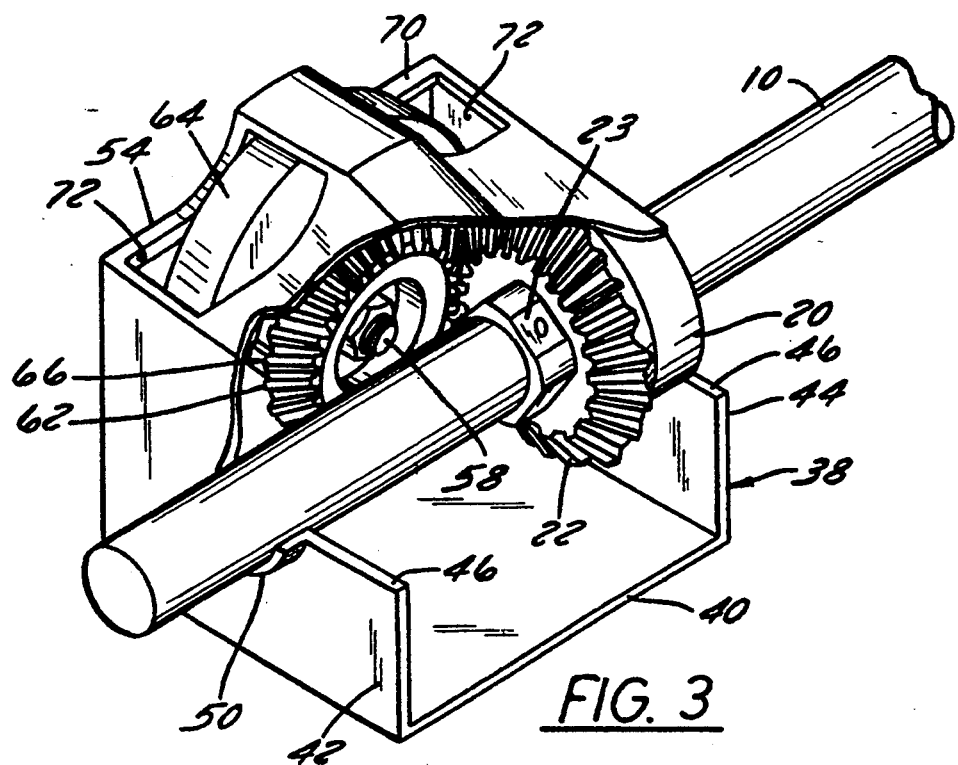
FIG. 3 is a broken-away perspective view partially in section of one of the drive portions of the conveyor shown in FIG. 1.

The top surface 70 of the housing 38 defines openings 72 which permit the drive tire 64 to project through the top surface 70 in order to contact and drive two adjacent rollers 14. FIG. 2 shows the drive tire 64 in broken lines as it drives two adjacent rollers 14. FIG. 7 shows the drive tire 64 projecting through the cut-outs 72 in the housing 38 to drive the two adjacent rollers 14.

An air-operated diaphragm 74 snaps onto a flat support bracket 76, which mounts to the box 26 by means of legs 77 that extend through slots 79 in the box 26 (shown best in FIG. 5). The purpose of the diaphragm 74 is to move the drive wheel 64 up and down to engage and disengage it from driving the rollers 14.

Figure 8:
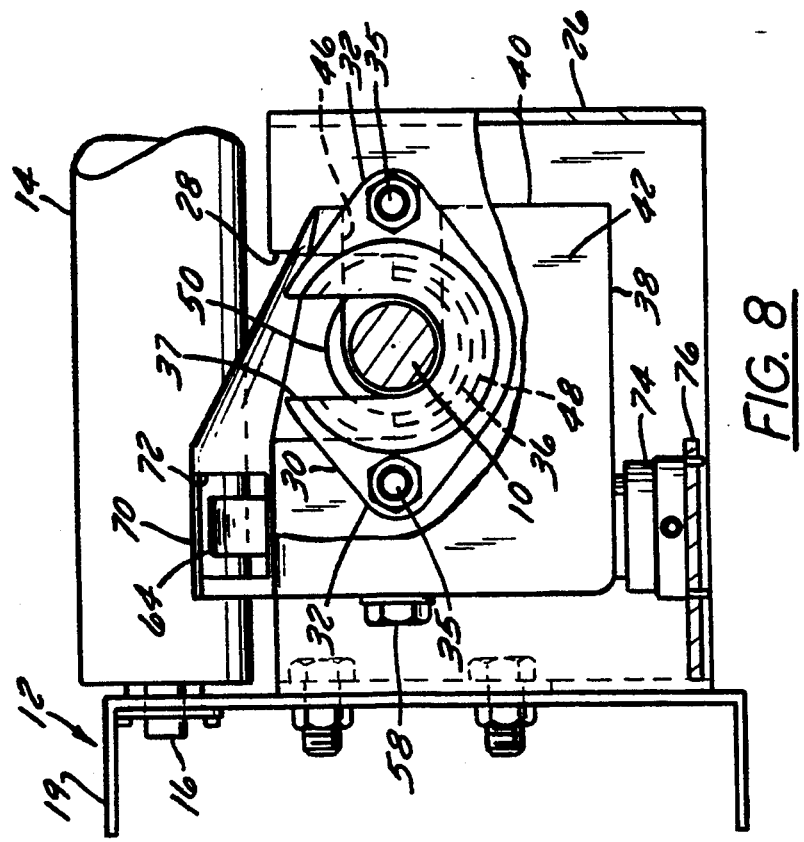
FIG. 8 is a front view partially in section of the drive portion as seen through the section 8—8 of FIG. 1 when the drive wheel housing is in the driving position.
Figure 9:
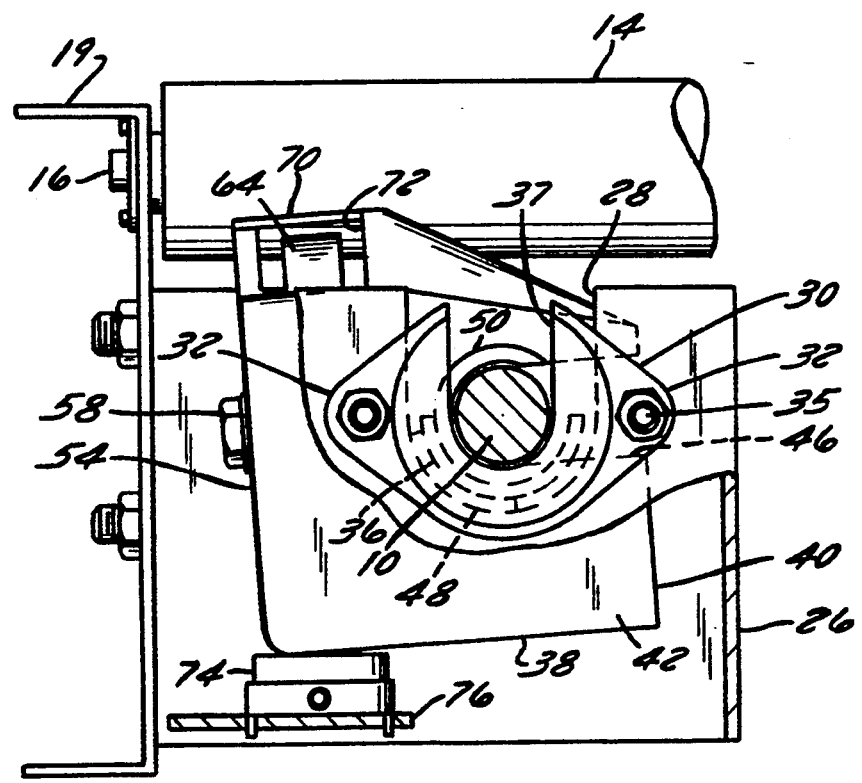
FIG. 9 is the same view as FIG. 7 except that the drive wheel housing is in the retracted, non-driving position.
Figure 11:
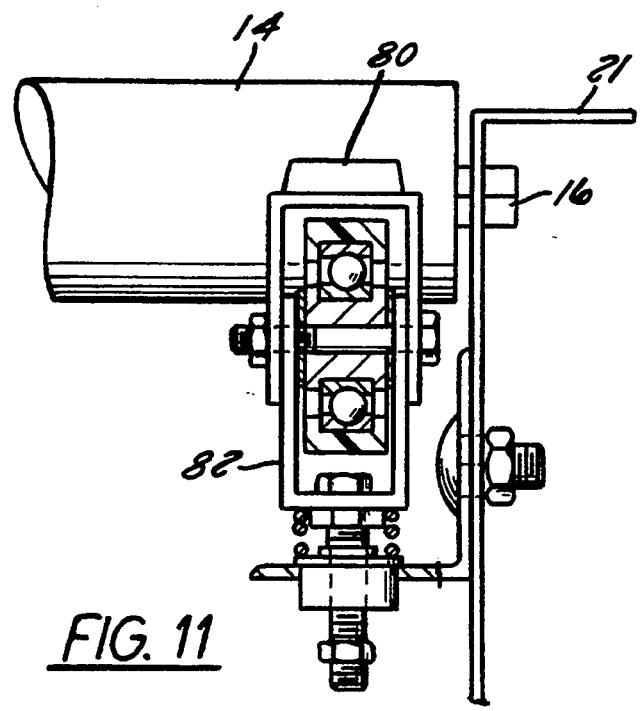
FIG. 11 is a front sectional view of one of the jump rollers taken through the section 11—11 of FIG. 1.

FIGS. 8 and 9 show the two positions the housing 38 takes, depending upon whether the diaphragm 74 is filled with air or not. When air enters the diaphragm 74, it pushes the diaphragm 74 upwardly, and the diaphragm pushes the left bottom portion of the housing 38 upwardly, pivoting the housing clockwise, and moving the drive wheel 64 into driving contact with its respective rollers 14 as shown in FIG. 8. When air is exhausted from the diaphragm 74, the weight of the drive wheel support frame 38 causes it to pivot back down, moving the drive wheel 64 out of driving contact with the rollers 14 as shown in FIG. 8. These drawings are exaggerated to show the pivoting motion. Actually, the drive tire 64 only has to move slightly (about ⅜ of an inch) to engage and disengage the rollers 14.

As shown in FIGS. 1, 2, 11, and 15 on the right side rail 21, opposite the rail 19 on which the drive mechanisms are mounted, are a plurality of jump wheels 80. Each jump wheel 80 is mounted so as to contact two adjacent rollers 14, and the function of each jump wheel 80 is to transmit power from one roller to the other. Each jump wheel 80 is mounted in a spring-loaded bracket 82, which pushes the jump wheel 80 upward into contact with the two adjacent rollers 14 while giving the jump wheel enough play to find the center between the adjacent rollers 14.

Thus, as each drive tire 64 drives two adjacent rollers 14, those rollers 14 drive their respective jump wheels 80, which, in turn, drive other rollers 14, so that, for a normal conveyor, each drive tire 64 will end up driving five rollers 14 (i.e. three jump wheels 80 for every drive wheel 64). The number of rollers to be driven by each drive mechanism will depend upon the weight of the articles to be carried, with fewer jump wheels being used in a conveyor intended to convey very heavy articles.

Assembly of the conveyor is as follows:

The diaphragm 74 is mounted on the diaphragm support bracket 76, which, in turn, is mounted on the main support bracket 26 by extending the legs 77 through the openings 79. The support bracket or support box 26 is bolted to the siderail 19 of the conveyor frame 12, and the housing supports 30 are bolted to the support bracket 26. The drive gears 20 (with their non-cylindrical cores 24) and the pinion adapters 23 are slipped over the drive shaft 10. The pinion adapters 23 are fixed to the driveshaft by means of set screws. The drive gears 20 are slipped over their respective pinion adapters 23 and can slide axially relative to the pinion adapters 23 while still being mounted on the pinion adapters. (When the driveshaft rotates, the pinion adapters rotate, causing the drive gears 20 to rotate.)

The drive shaft is then dropped through the open top of the support bracket 26 into the U-shaped cut-outs 37 in the housing supports 36, with each drive gear 20 located inside its respective support bracket 26.

The drive shaft 10 is mounted to the siderail 19 by means of bearings 17 which are bolted to every other support box 26. (The bearing 17 can be seen in FIG. 1.) The drive shaft 10 is mounted so that there is clearance between the driveshaft 10 and the support box 26.

Next, the housing 38 is assembled and installed. The driven gears 62 and drive tires 64 are assembled together and mounted on their respective bearings 60 and in their respective housings 38 by means of bolts 58. The housings 38 are then rotated 90 degrees, are dropped down over the drive shaft 10, meshing the driven gear 62 with the drive gear 20, and the housings 38 are then rotated back 90 degrees so that they are supported on the projections 36 of the housing supports 30. Each housing 38 can now pivot about the axis of the driveshaft 10 by pivoting on the projections 36 on the housing supports 30, which are coaxial with the driveshaft. The drive wheel frame (or housing) 38 rests on the diaphragm 74 at the bottom of the support box 26. Again, there is clearance between the driveshaft 10 and the housings 38. The axis of the drive wheel 64 is substantially parallel to the axes of the conveyor rollers 14 and substantially perpendicular to the axis of the driveshaft 10.

The purpose of this unusual mounting arrangement, with the support box 26 mounted to the siderail and the housing 38 suspended from the support box 26, is to avoid the problem of having these elements mounted directly to the driveshaft 10, in which case those parts would require high speed bearings to handle their contact with the driveshaft 10. This arrangement provides a clearance fit between the driveshaft and those parts, so no such bearings are required.

In a ten-foot section of siderail 19, there should be four evenly-spaced support boxes 26 with their respective housings and gears. The preassembled ten-foot section of siderail 19, driveshaft 10, support box 26 and housing 38 may be stored in a warehouse as a stock item.

The drive mechanism is thus completely assembled in the section of left siderail 19. To put together the rest of the conveyor 10, the jump wheels 80 are mounted on the right siderail 21, a cross-member 29 is bolted between the left and right siderails 19, 21, defining the width of the conveyor, and the rollers 14 are mounted across the conveyor frame 12 by retracting one of the shaft ends 16 of each roller and placing the shaft ends 16 into the hexagonal holes 18 in the siderails 19, 21.

Sections of the conveyor frame 12 are then bolted together, and sections of driveshaft 10 are connected together with known connectors (not shown). The drive motor (not shown) is attached to the driveshaft, and the conveyor is ready for operation.

The air hoses, valves, and logic for controlling the diaphragms 74 are not shown, but they are standard, as used in known accumulation conveyors.

Operation of the first embodiment of the conveyor is as follows:

Whenever the drive motor (not shown) is operating, it causes the driveshaft 10 to rotate, which causes all the drive gears 20 mounted on the driveshaft 10 to rotate. The driven gears 62 are constantly meshed with the drive gears 20, which eliminates any problem with meshing and unmeshing gears, and which means that, whenever the driveshaft 10 rotates, the driven gears 62 rotate.

Because of the connection between the driven gears 62 and their respective drive wheels 64, the driven gears 62 cause the drive wheels 64 to rotate. Thus, whenever the driveshaft 10 rotates, the drive wheels 64 rotate.

The force between the drive gear, 20 and the driven gear 62 causes the driven gear to be pushed backward, to be stopped by the back surface of the core 24 of the drive gear 20 pushing against the housing thrust washer 68 mounted on the rear face 44 of the housing 38. The ability of the drive gear 20 to float axially permits the housing 38 to float with the drive gear 20, so that the drive wheel 64 can seek the center between the two rollers 14 it is driving. This ability to seek the center provides latitude in the manufacturing tolerances of the conveyor. It is also possible to fix the drive gear 20 to the driveshaft 10 so that it does not float axially along the driveshaft, by tightening a set screw in the drive gear 20 (not shown), if desired.

The drive wheel mounting frame 38 rests on the diaphragm 74, and the drive wheel 64 lies under two adjacent rollers 14. When the diaphragm 74 is inflated, it pivots the drive wheel support frame 38 upwardly, so that the drive wheel 64 contacts and drives its two rollers 14. When air pressure is exhausted from the diaphragm 74, the drive wheel 64 pivots downward, out of driving contact with the conveyor rollers 14, so the rollers 14 stop rotating and can be used to accumulate product.

Maintenance of this conveyor is very simple. In general, there is very little maintenance. The parts which are most likely to wear are the housing thrust washer 68 and the driven gear 62, which can be replaced by popping out two rollers 14, rotating the drive wheel support frame 38 and lifting it out of the conveyor, removing the worn parts,, and replacing them. A spare assembled housing 38 may be kept on hand so that it can be quickly dropped into place to keep conveyor down time to a minimum.

Figure 14:
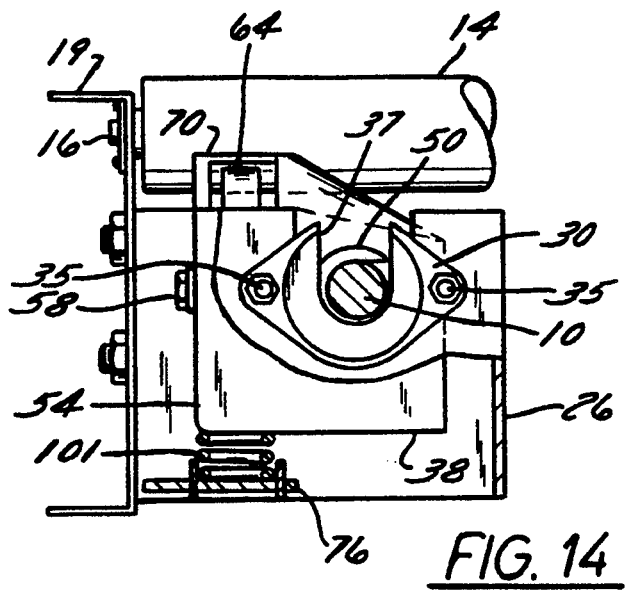
FIG. 14 is the same view as FIG. 8, except that a spring is being used instead of the diaphragm to keep the drive wheel in the driving position.
Figure 15:
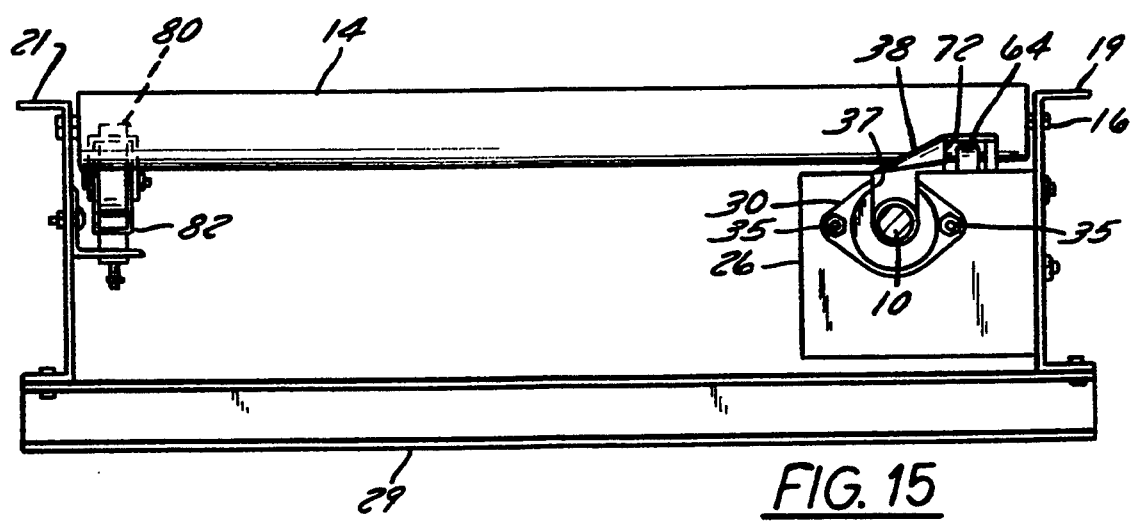
FIG. 15 is a rear sectional view of the conveyor of FIG. 1 taken through the section 15—15 of FIG. 1.

An alternate embodiment of the conveyor could be made by installing springs in the place of the diaphragms 74. This type of installation is shown in FIG. 14. In this arrangement, the spring 101 keeps the drive wheel housing 38 in the raised, driving position at all times. This installation could be made if the customer does not want to use the conveyor for accumulation at the outset but wants the option of converting to accumulation at a later time. The springs 101 are installed on the diaphragm support bracket 76 in order to keep the drive wheel 64 in contact with its rollers 14 at all times. In this arrangement, the rollers 14 rotate whenever the driveshaft 10 rotates, and sections of the conveyor cannot be stopped without stopping the entire conveyor. However, this continues to be a simple, easily-maintained conveyor, and it can be converted to an accumulation conveyor at any time, simply by adding the diaphragms 74, an air compressor, and air hoses running to the diaphragms 74.

Figure 12:
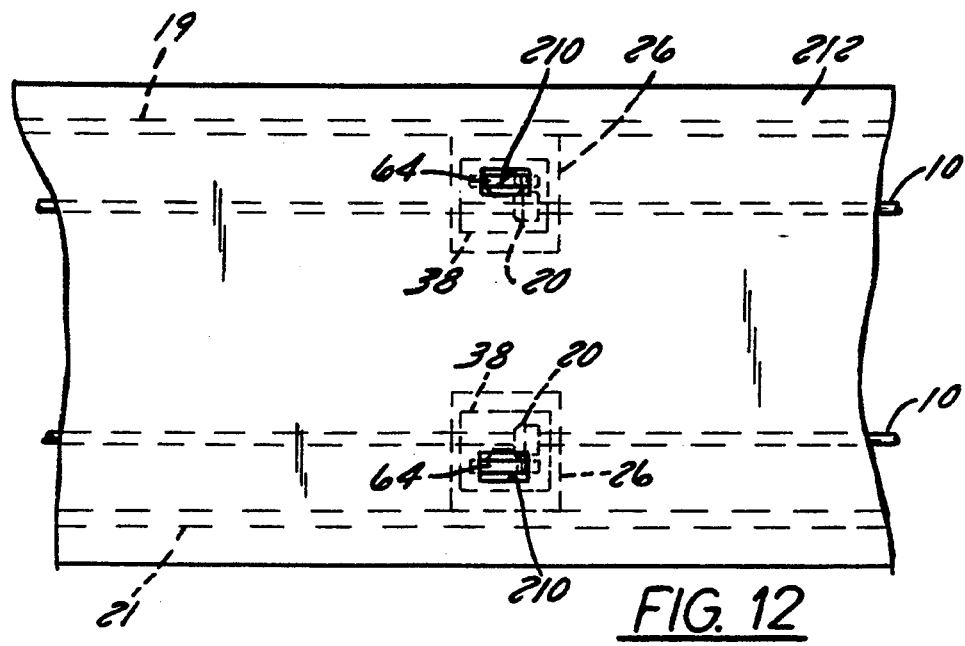
FIG. 12 is a schematic plan view of a second embodiment of the invention.
Figure 13:
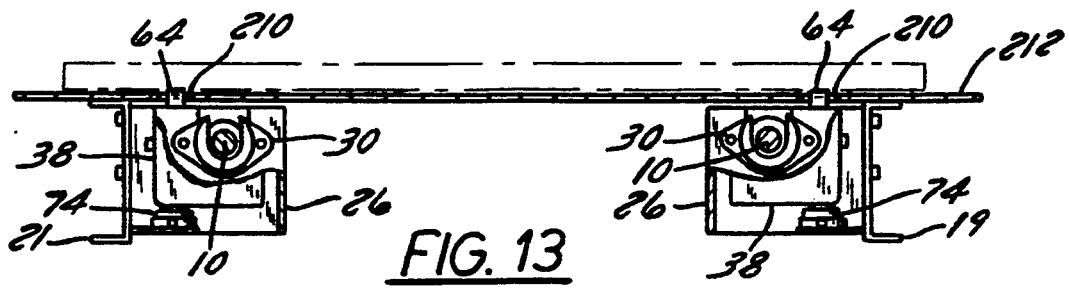
FIG. 13 is a schematic front sectional view of the embodiment shown in FIG. 12.

A second alternative embodiment, shown in FIGS. 12 and 13, eliminates the conveyor rollers entirely and uses the drive wheels 64 to convey the products. In this case, two parallel driveshafts 10 are used. Left and right drive wheels 64 are located opposite to each other and can be used to drive pallets. In this embodiment, the drive wheels 64 pivot upwardly through holes 210 in a table 212 in order to contact the pallets directly and move the pallets along the conveyor path defined by the table 212. The support boxes 26, housing supports 30, housings 38, and drive gear and driven gear arrangement are identical in this embodiment to the first embodiment. The basic difference is that there are no rollers 14, so the drive tires 64 contact the product directly.

Figure 16:
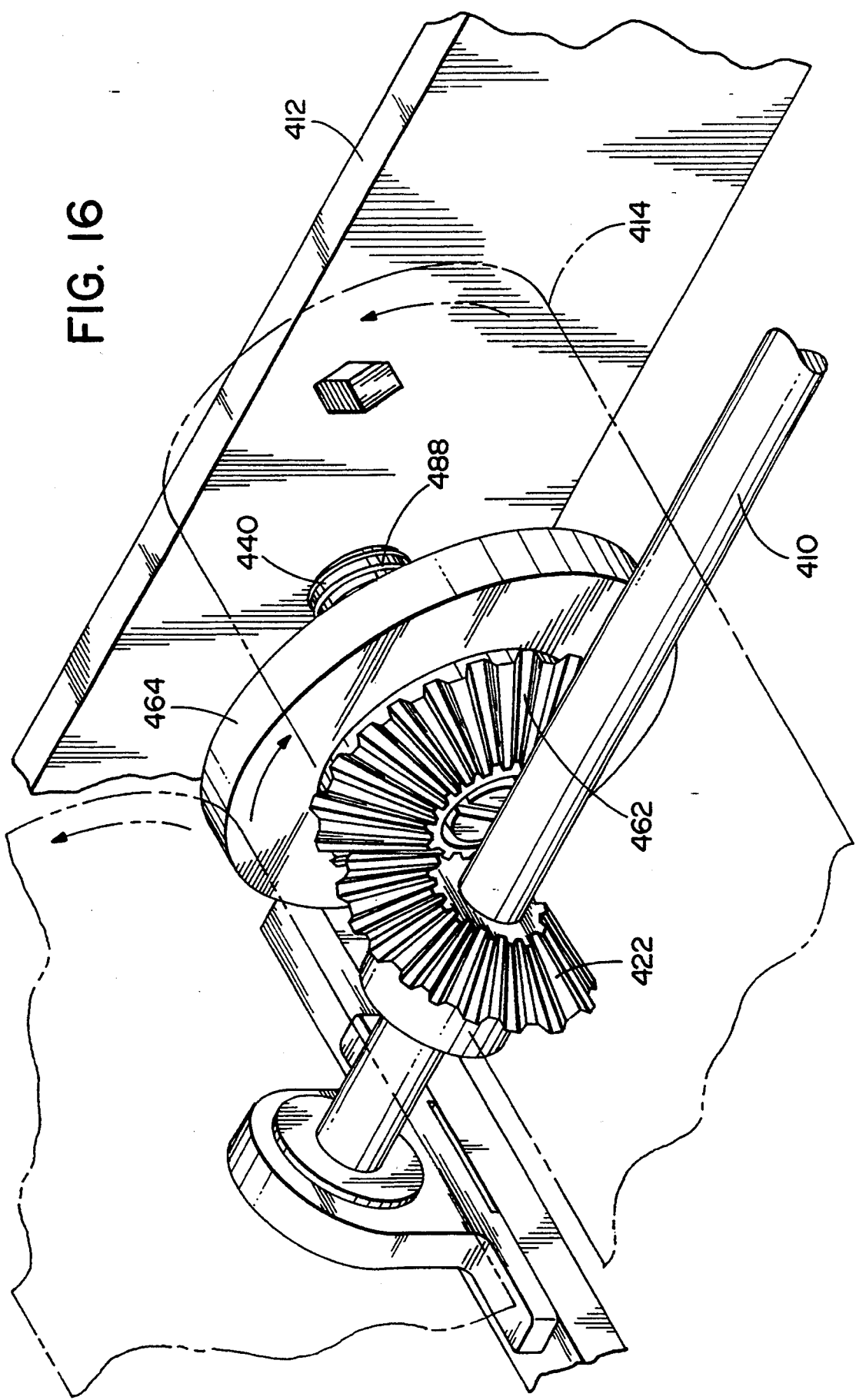
FIG. 16 is a broken-away perspective view of a third embodiment of the invention.
Figure 17:
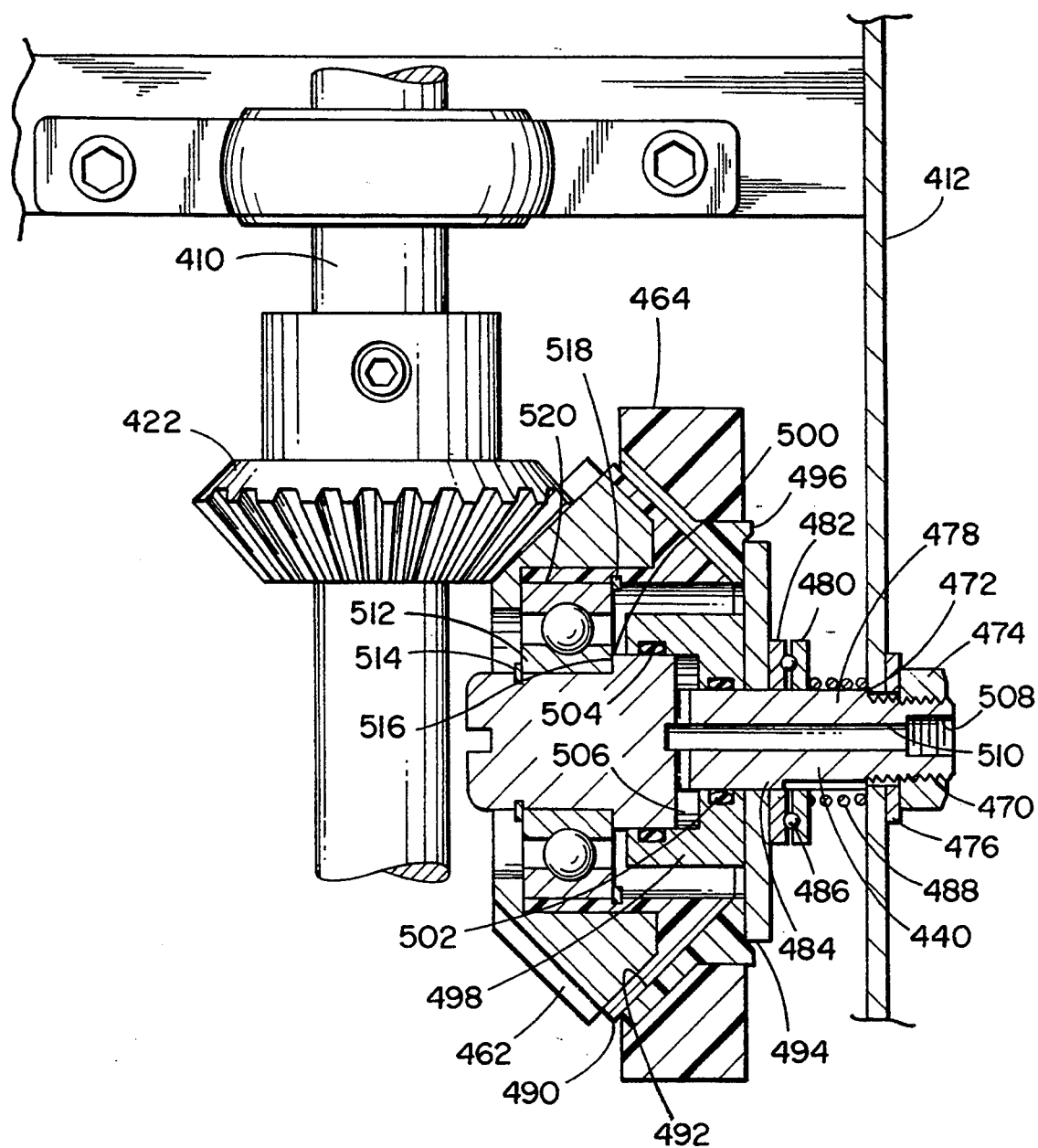
FIG. 17 is a top view partially in section of the embodiment shown in FIG. 16.
Figure 18:
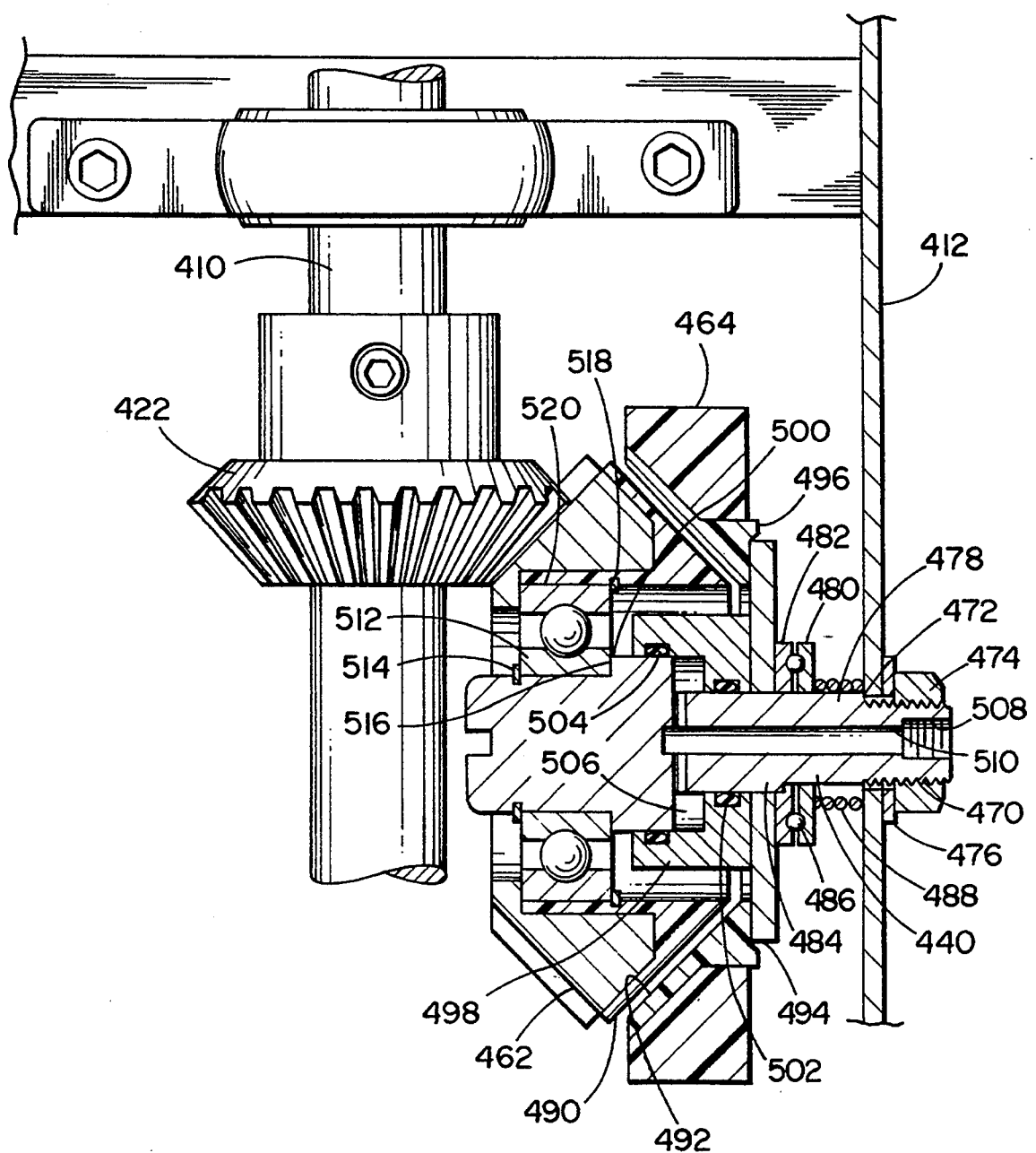
FIG. 18 is the same view as FIG. 17, but with the drive wheel in the accumulate position.

A fourth embodiment of the present invention is shown in FIGS. 16–18. In this embodiment, there is a first bevelled gear 422 mounted on the driveshaft 410, and there is a second bevelled gear 462 mounted on a stub shaft 440, which is mounted to the siderail 412 of the conveyor. The first and second bevelled gears 422, 462 are fixed to their respective shafts 410, 440, so that they are continuously meshed with each other. This means that, whenever the drive shaft 410 rotates, it causes the first bevelled gear 422 to rotate, which causes the second bevelled gear 462 to rotate.

Between the second bevelled gear 462 and the conveyor rail 412 is a drive wheel 464, which is also mounted on the stub shaft 440.

FIG. 17 shows how the second bevelled gear 462 and the drive wheel 464 are mounted on the stub shaft 440. The stub shaft 440 has a threaded end 470, which terminates at a shoulder 472, which is larger than the opening in the siderail 412 through which the threaded end 470 extends. For the purposes of this part of the description, the threaded end 470 will be referred to as the back end of the shaft 440. A nut 474 and lock washer 476 are used to mount the stub shaft 440 on the siderail 412.

In front of the shoulder 472 is a portion 478 of the stub shaft 440 which has a D-shaped cross-section, and the back half 480 of a thrust bearing is mounted on that D-shaped cross-section portion 478 and has a corresponding D-shaped cross-section, so as to prevent rotation of the back half 480 of the thrust bearing relative to the stub shaft 440. The front half 482 of the thrust bearing has a cylindrical cross-section and is mounted on a portion 484 of the stub shaft 440 which is cylindrical and has the same diameter as the D-shaped portion 478 of the stub shaft 440. Balls 486 are mounted between the two halves 480, 482 of the thrust bearing to permit the front portion of the thrust bearing to rotate relative to the back portion without excessive friction or wear. A spring 488 is mounted on the stub shaft 440 between the siderail 412 and the back half 480 of the thrust bearing. The spring 488 biases the drive wheel 464 into engagement with the back face 490 of the second bevelled gear 462.

The next element mounted on the stub shaft 440 is a ring 494, which is preferably made of steel. The ring 494 has a cylindrical inside diameter which is about 0.001 inches larger in diameter than the cylindrical portion 484 of the stub shaft 440, and an outside diameter which is large enough to have good surface contact with the back side of the drive wheel 464.

The drive wheel 464 has a cylindrical outer surface, which is in friction contact with two of the conveyor rollers, as in the first embodiment, when the drive wheel 464 is in the driving position. The back face 490 of the second bevelled gear 462 has a frustro-conical shape (at an angle of about 45° to the axis of the stub shaft 440), and the front face 492 of the drive wheel 464 has a frustro-conical shape (also at an angle of about 45°) which mates with that frustro-conical back face 490. When the spring 488 pushes the front face 492 of the drive wheel 464 into engagement with the back face 490 of the second gear 462, the second bevelled gear 462 drives the drive wheel 464. The drive wheel 464 is preferably made of two materials which are molded together to form a single piece. The inner piece, which contacts the back of the second bevelled gear 462 and the ring 494, is preferably made of Delrin, and the outer piece, which contacts the conveyor rollers, is preferably made of polyurethane. The inner piece defines an annular shoulder 496, with a tapered inner surface which fits around the outside diameter of the ring 494.

The next element mounted on the stub shaft 440 is an air pressure ring 498, which has a small inside diameter portion which mounts on the same cylindrical portion 484 of the stub shaft 440 as does the ring 494, and a large inside diameter portion, in front of the small diameter portion, which mounts on a large diameter portion 500 of the stub shaft 440. Both the small inside diameter portion and the large inside diameter portion of the air pressure ring 498 seal against their respective portions of the stub shaft. 440 by means of O-ring seals 502, 504, respectively. An annular chamber 506 is formed between the small seal 502 and the large seal 504. The forward and inner walls of the annular chamber 506 are formed by the shaft 440, and the rear and outer walls of the chamber 506 are formed by the air pressure ring 498. The chamber 506 is in fluid communication with an air inlet 508 at the end of the shaft 440 through a conduit 510 in the shaft 440.

In front of the pressure ring 498 is a bearing 512, on which is mounted the second bevel gear 462. The inner race of the bearing 512 is mounted between a snap ring 514 and a shoulder 516 on the shaft 440. The outer race of the bearing 512 is mounted between a snap ring 518 and a shoulder 520 on the bevel gear 462.

Operation of the embodiment shown in FIGS. 16–18 is as follows: The drive shaft 410 rotates, causing the first bevel gear 422 to rotate. The first bevel gear 422 drives the second bevel gear 462. Under normal driving conditions, the spring 488 pushes against the siderail 412 and against the thrust bearing 480, causing the thrust bearing to push against the ring 482, which, in turn, pushes against the back of the drive wheel 464, forcing the drive wheel 464 into friction engagement with the back surface 490 of the second bevel gear 462 and with the conveyor rollers, thereby causing the drive wheel 464 to rotate and to drive the conveyor rollers.

When pressurized air is forced into the air inlet 508, it travels through the conduit 510 and into the chamber 506. The pressurized air pushes against the walls of the chamber 506, causing the pressure ring 498 to shift about ⅜ inch to the right, pushing against the ring 494 and overcoming the force of the spring 488 so as to permit the drive wheel 464 to move back, as shown in FIG. 18. FIG. 18 shows a gap between the back surface 490 of the second gear 462 and the front surface of the drive wheel 464. As the drive wheel 464 moves back, it moves down slightly, its axis of rotation shifting down, below the axis of the stub shaft 440, so that the drive wheel 464 is out of contact with the conveyor rollers. The drive wheel 464 then contacts the back surface of the second bevel gear 462 only at the uppermost point (not shown), and there is a gap between the drive wheel and the second bevel gear around the rest of their frustro-conical surfaces. Because there is no load on the drive wheel 464, it can be driven in a freewheeling mode by the small amount of friction from the point contact with the second bevel gear. However, there is not sufficient friction between the second bevel gear and the drive wheel 464 to transfer a driving force to the conveyor rollers, even if the drive wheel did contact the conveyor rollers. Thus, when the pressure ring 498 overcomes the spring bias and shifts backward, it disconnects the train of driving elements, so the conveyor rollers driven by the drive wheel 464 stop rotating and begin to accumulate. When the controller wishes to resume driving that section of the conveyor, the air pressure is vented from the chamber 506 through the conduit 510 and inlet 508, and the spring force again takes over, pushing the front surface 492 of the drive wheel 464 into frictional engagement with the back surface 490 of the second bevelled gear 462.

FIGS. 19–23 show another embodiment of the invention, in which the conveyor rollers themselves shift up and down out of contact with the drive wheel in order to go into the accumulation mode.

Looking at FIG. 19, the conveyor 600 has a plurality of rollers 614 with shafts 616 (not shown in this view) mounted in slots 618 in the siderails 612. The mechanism for driving these rollers 614 is shown in FIG. 23. A first bevelled gear 620 is mounted on the driveshaft 610 and is held in place by a set screw. Thus, when the driveshaft 610 rotates, the first bevelled gear 620 also rotates.

A second bevelled gear 662 is mounted on a shaft 640, which is mounted on the siderail 612 by means of a nut and lock washer. A drivewheel 664 is mounted on a cylindrical projection 665 on the back of the second bevelled gear 662. The second bevelled gear 662 is mounted so as to be constantly meshed with the first bevelled gear 620 so that, whenever the driveshaft 610 rotates, it causes the first bevelled gear 620 to drive the second bevelled gear 662 and the drive wheel 664, which is mounted on the second bevelled gear 662. When the conveyor rollers 614 are in their normal, lowered position, as shown in FIG. 21, the drive wheels 664 are in frictional engagement with the rollers 614 and drive the rollers 614.

The mechanism for lifting the rollers 614 up, out of engagement with the drive wheels 664 is shown in FIGS. 19 and 20. There are a plurality of upper brackets 670 and lower brackets 672 mounted on the siderails 612. The lower brackets 672 are fixed to the siderails. The upper brackets 670 are mounted by bolts 674 which project through circular holes in the upper brackets 670 and through elongated holes in the siderails 612, permitting the upper brackets 670 to shift up and down relative to the siderails 612. Each upper bracket 670 has a lower bracket 672 of the same length below it, and the length of this pair of brackets defines the length of an accumulation zone. Small hydraulic cylinders 676 are mounted between the upper and lower brackets 670, 672 in order to cause the raising and lowering of the upper brackets 670 relative to the lower brackets 672. While this figure shows only one side of the conveyor 600, it is understood that the other side is the same, with upper and lower brackets 670, 672 and cylinders 676 on the other side as well.

FIG. 20 shows that the tops of the upper brackets 670 support the bottom of the shafts 616 of the conveyor rollers 614 so that, when the upper brackets 670 move upward, they lift up the shafts 616, which lifts the rollers 614, so that the rollers 614 are out of contact with the rotating drive wheels 664 for that section of the conveyor, permitting that section of the conveyor to accumulate product. FIG. 22 shows the rollers 614 lifted up, out of contact with the drive wheels 664.

When the hydraulic fluid is exhausted from the cylinders 676, the upper brackets 670 and the rollers 614 move back down, so that the rollers 614 are again in contact with and driven by the drive wheels 664.

It can thus be seen that, in all the embodiments, except the embodiments without conveyor rollers, there is a relative motion between the conveyor rollers and the drive wheels which engages and disengages the drive. The drive wheel may shift out of driving contact with the conveyor roller, or the conveyor roller may shift out of driving contact with the drive wheel.

It will be obvious to those skilled in the art that modifications may be made to the embodiments described above without departing from the scope of the present invention.

What is claimed is:

1. A conveyor, comprising:
a conveyor frame;
at least one conveyor roller mounted on said conveyor frame;
a drive shaft extending along said conveyor frame;
at least one drive wheel rotatable about its axis and driven from said drive shaft;
wherein said conveyor roller and drive wheel are mounted for relative motion between them, such that, in a first position, said conveyor roller is driven from said drive wheel, and, in a second position, said one conveyor roller is out of driving engagement with said drive wheel.

2. A conveyor as recited in claim 1, wherein said drive wheel is movable relative to said conveyor frame, such that, when said drive wheel is moved to a first position, said drive wheel is in driving contact with said conveyor roller, and, when said drive wheel is moved to a second position, said drive wheel is out of driving contact with said conveyor roller.

3. A conveyor as recited in claim 1, wherein said conveyor roller is movable relative to its drive wheel, such that, in a first position, said conveyor roller is driven by its drive wheel, and, in a second position, said conveyor roller is out of driving engagement with its drive wheel.

4. A conveyor as recited in claim 1, wherein said drive wheel is driven whenever said drive shaft rotates, regardless of whether said drive wheel is in contact with its respective roller or out of contact with its respective roller.

5. A conveyor as recited in claim 1, and further comprising:
a drive gear mounted on said drive shaft; and
a driven gear mounted so as to drive said drive wheel; said driven gear being continuously meshed with said drive gear, such that, when there is relative motion between said drive wheel and said one conveyor roller, said drive gear and driven gear remain continuously meshed.

6. A conveyor as recited in claim 5, wherein said driven gear and said drive wheel are mounted for rotation about the same axis, such that, whenever said driven gear rotates, it causes said drive wheel to rotate.

7. A conveyor as recited in claim 5, wherein said drive wheel can be shifted into and out of driving engagement with said driven gear.

8. A conveyor, comprising:
a conveyor frame;
a drive shaft extending along said conveyor frame;
at least one conveyor roller mounted on said conveyor frame, with the axis of said conveyor roller substantially perpendicular to the axis of said drive shaft;
at least one drive wheel rotatable about an axis which is substantially perpendicular to the axis of the drive shaft, said drive wheel being driven from the drive shaft; and
means for causing relative motion between said drive wheel and said conveyor roller for engaging and disengaging said drive wheel from driving said conveyor roller.

9. A conveyor as recited in claim 8, and further comprising:
a drive gear mounted on said drive shaft;
a drive wheel mounting frame on which said drive wheel is mounted; and
a driven gear mounted on said drive wheel mounting frame and continuously meshed with said drive gear, said drive wheel being driven from said driven gear.

10. A conveyor as recited in claim 9, wherein said drive wheel is mounted coaxially with said driven gear such that, when said driven gear rotates it causes said drive wheel to rotate.

11. A conveyor as recited in claim 9, and further comprising a bracket mounted on said conveyor frame and movable relative to said conveyor frame, wherein movement of said bracket causes relative motion between said conveyor roller and said drive wheel for engaging and disengaging the drive between said drive wheel and said conveyor roller.

12. A conveyor as recited in claim 9, wherein movement of said bracket causes said drive wheel to move relative to said conveyor roller.

13. A conveyor as recited in claim 9, wherein movement of said bracket causes said conveyor roller to move relative to said drive wheel.

* * * * *

REEXAMINATION CERTIFICATE (3055th)
United States Patent [19]
Collins et al.

[11] B1 5,375,696
[45] Certificate Issued Nov. 12, 1996

[54] HIGH-SPEED LINESHAFT-DRIVEN ACCUMULATING CONVEYOR

[75] Inventors: Ellsworth H. Collins, Mt. Washington; William A. Fultz; James F. Mattingly, both of Louisville, all of Ky.

[73] Assignee: Interlake Companies, Shepherdsville, Ky.

Reexamination Request:
No. 90/003,811, Apr. 26, 1995

Reexamination Certificate for:
Patent No.: 5,375,696
Issued: Dec. 27, 1994
Appl. No.: 168,474
Filed: Dec. 16, 1993

Related U.S. Application Data

[63] Continuation-in-part of Ser. No. 14,378, Feb. 5, 1993, Pat. No. 5,287,956.
[51] Int. Cl.[6] ................................. B65G 13/06
[52] U.S. Cl. ...................... 198/781.04; 198/791
[58] Field of Search .......... 198/781.04, 781.08, 198/781.06, 781.01, 781.02, 781.07, 781.05, 789, 791

[56] References Cited

U.S. PATENT DOCUMENTS

| | | | |
|---|---|---|---|
| 3,900,097 | 8/1975 | de Courcy | 198/781.06 |
| 4,103,769 | 8/1978 | Jorgensen | 198/781.04 |
| 4,109,783 | 8/1978 | Vogt | 198/781.08 |
| 4,164,998 | 8/1979 | DeGood et al. | 198/781.06 |
| 4,193,492 | 3/1980 | Hammond | 198/781 |
| 4,264,005 | 4/1981 | Smock | 198/781.06 |
| 4,344,527 | 7/1981 | Vogt et al. | 198/781.04 |
| 4,473,149 | 9/1984 | Vogt et al. | 198/781.04 |
| 4,572,358 | 2/1986 | Swain | 198/781.04 |
| 4,753,339 | 6/1988 | Vogt et al. | 198/781.04 |
| 4,815,588 | 3/1989 | Katsuragi et al. | 198/781.04 |
| 4,960,202 | 10/1990 | Rice et al. | 198/781.02 |
| 5,038,922 | 8/1991 | Collins et al. | 198/781.04 |

*Primary Examiner*—Joseph E. Valenza

[57] ABSTRACT

The rollers of a live roller conveyor are driven by drive wheels, which are driven from a driveshaft extending along the conveyor. When the drive wheels and their respective conveyor rollers are in contact with each other, the drive wheels cause the conveyor rollers to rotate. When the drive wheels and conveyor rollers are out of contact, the rollers are not driven and can accumulate product. Relative motion between the drive wheels and the conveyor rollers causes the drive to be engaged and disengaged.

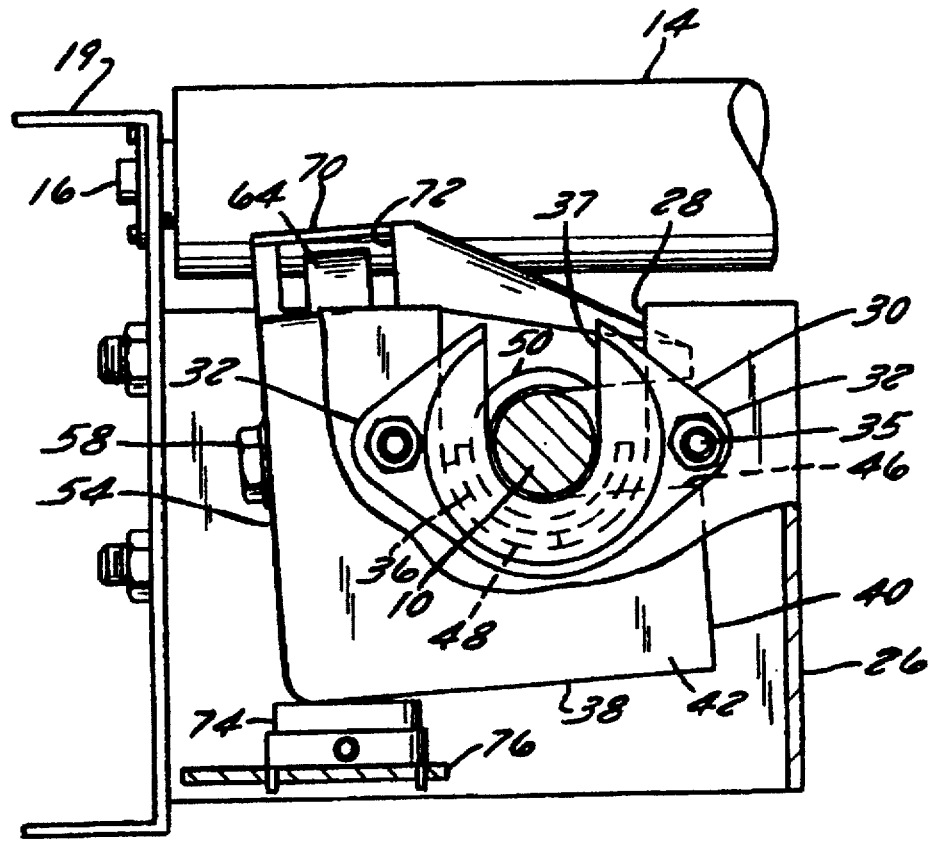

B1 5,375,696

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 65–68, Column 5, lines 1 and 2:

An air-operated diaphragm 74 snaps onto a flat support bracket 76, which mounts to the box 26 by means of legs 77 that extend through slots 79 in the box 26 (shown best in FIG. 5). The purpose of the diaphragm 74 is to *serve as a type of actuator to automatically* move the drive wheel 64 up and down to engage and disengage it from driving the rollers 14.

Column 5, lines 3–17:

FIGS. 8 and 9 show the two positions the housing 38 takes, depending upon whether the diaphragm 74 is filled with air or not. When air enters the diaphragm 74, it pushes the diaphragm 74 upwardly, and the diaphragm pushes the left bottom portion of the housing 38 upwardly, pivoting the housing clockwise, and moving the drive wheel 64 into driving contact with its respective rollers 14 as shown in FIG. 8. When air is exhausted from the diaphragm 74, the weight of the drive wheel support frame 38 causes it to pivot back down, moving the drive wheel 64 out of driving contact with the rollers 14 as shown in FIG. [8] *9*. These drawings are exaggerated to show the pivoting motion. Actually, the drive tire 64 only has to move slightly (about [⅝] *⅛* of an inch) to engage and disengage the rollers 14.

Column 9, lines 32–66:

When pressurized air is forced into the air inlet 508, it travels through the conduit 510 and into the chamber 506. The pressurized air pushes against the walls of the chamber 506, causing the pressure ring 498 to shift about [⅝] *⅛* inch to the right, pushing against the ring 494 and overcoming the force of the spring 488 so as to *serve as a type of actuator to automatically* permit the drive wheel 464 to move back, as shown in FIG. 18. FIG. 18 shows a gap between the back surface 490 of the second gear 462 and the front surface of the drive wheel 464. As the drive wheel 464 moves back, it moves down slightly, its axis of rotation shifting down, below the axis of the stub shaft 440, so that the drive wheel 464 is out of contact with the conveyor rollers. The drive wheel 464 then contacts the back surface of the second bevel gear 462 only at the uppermost point (not shown), and there is a gap between the drive wheel and the second bevel gear around the rest of their frusto-conical surfaces. Because there is no load on the drive wheel 464, it can be driven in a freewheeling mode by the small amount of friction from the point contact with the second bevel gear. However, there is not sufficient friction between the second bevel gear and the drive wheel 464 to transfer a driving force to the conveyor rollers, even if the drive wheel did contact the conveyor rollers. Thus, when the pressure ring 498 overcomes the spring bias and shifts backward, it disconnects the train of driving elements, so the conveyor rollers driven by the drive wheel 464 stop rotating and begin to accumulate. When the controller wishes to resume driving that section of the conveyor, the air pressure is vented from the chamber 506 through the conduit 510 and inlet 508, and the spring force again takes over, pushing the front surface 492 of the drive wheel 464 into frictional engagement with the back surface 490 of the second bevelled gear 462.

Column 10, line 25–44:

The mechanism for *serving as a type of actuator and automatically* lifting the rollers 614 up, out of engagement with the drive wheels 664 is shown in FIGS. 19 and 20. There are a plurality of upper brackets 670 and lower brackets 672 mounted on the siderails 612. The lower brackets 672 are fixed to the siderails. The upper brackets 670 are mounted by bolts 674 which project through circular holes in the upper brackets 670 and through elongated holes in the siderails 612, permitting the upper brackets 670 to shift up and down relative to the siderails 612. Each upper bracket 670 has a lower bracket 672 of the same length below it, and the length of this pair of brackets defines the length of an accumulation zone. Small hydraulic cylinders 676 are mounted between the upper and lower brackets 670, 672 in order to cause the raising and lowering of the upper brackets 670 relative to the lower brackets 672. While this finger shows only one side of the conveyor 600, it is understood that the other side is the same, with upper and lower brackets 670, 672 and cylinders 676 on the other side as well.

AS A RESULT OF REEXAMINATION, IT HAS BEEN DETERMINED THAT:

Claims 8 and 11–13 are cancelled.

Claims 1–3, 5 and 9 are determined to be patentable as amended.

Claims 4, 6, 7 and 10, dependent on an amended claim, are determined to be patentable.

New claims 14, 15 are added and determined to be patentable.

1. A conveyor, comprising:
a conveyor frame *defining elongated openings*;
at least one conveyor roller mounted *in said elongated openings* on said conveyor frame *and having an axis of rotation*;
a drive shaft extending along said conveyor frame;
at least one drive wheel rotatable about its axis and driven from said drive shaft, *the axis of said drive wheel being parallel to the axis of said conveyor roller at least when the driven wheel and roller are in driving engagement*;
wherein said conveyor roller and drive wheel are mounted for relative motion between them, such that, in a first position, said conveyor roller is driven from said drive wheel *by contact with the outer surface of the conveyor roller*, and, in a second position, said one conveyor roller is out of driving engagement with said drive wheel; *and further comprising an actuator which automatically moves said roller downwardly relative to said elongated openings, into driving contact with said drive wheel, and moves said roller upwardly relative to* said elongated openings, out of driving engagement with said drive wheel.

2. A conveyor [as recited in claim 1], comprising:

a conveyor frame;

at least one conveyor roller mounted on said conveyor frame and having an axis of rotation;

a drive shaft extending along said conveyor frame;

at least one drive wheel rotatable about its axis and driven from said drive shaft, the axis of said drive wheel being parallel to the axis of said conveyor roller at least when said drive wheel is in driving engagement with said conveyor roller;

wherein said conveyor roller and drive wheel are mounted for relative motion between them, such that, in a first position, said conveyor roller is driven from said drive wheel by contact with the outer surface of the conveyor roller, and, in a second position, said conveyor roller is out of driving engagement with said drive wheel; and further comprising an actuator which automatically provides said relative motion between said conveyor roller and said drive wheel, wherein said drive wheel is movable relative to said conveyor frame, such that, when said drive wheel is moved to a first position, said drive wheel is in driving contact with said conveyor roller, and, when said drive wheel is moved to a second position, said drive wheel is out of driving contact with said conveyor roller.

3. A conveyor [as recited in claim 1], comprising:

a conveyor frame, defining elongated openings;

at least one conveyor roller mounted in said elongated openings on said conveyor frame and having an axis of rotation;

a drive shaft extending along said conveyor frame;

at least one drive wheel rotatable about its axis and driven from said drive shaft;

wherein said conveyor roller is movable relative to its drive wheel, such that, in a first position, said conveyor roller is driven by its drive wheel *by contact with the outer surface of said conveyor roller*, and, in a second position, *in which said conveyor roller is shifted upwardly relative to said elongated openings and away from said drive wheel*, said conveyor roller is out of driving engagement with its drive wheel.

5. A conveyor [as recited in claim 1, and further], comprising:

a conveyor frame;

at least one conveyor roller mounted on said conveyor frame;

a drive shaft extending along said conveyor frame;

at least one drive wheel rotatable about its axis and driven from said drive shaft;

wherein said conveyor roller and drive wheel are mounted for relative motion between them, such that, in a first position, said conveyor roller is driven from said drive wheel by contact with the outer surface of said conveyor roller, and, in a second position, said one conveyor roller is out of driving engagement with said drive wheel;

a drive gear mounted on said drive shaft; and a driven gear mounted so as to drive said drive wheel; said driven gear being continuously meshed with said drive gear, such that, when there is relative motion between said drive wheel and said one conveyor roller, said drive gear and driven gear remain continuously meshed.

9. A conveyor [as recited in claim 8, and further], comprising:

a conveyor frame;

a drive shaft extending along said conveyor frame;

at least one conveyor roller mounted on said conveyor frame, with the axis of said conveyor roller substantially perpendicular to the axis of said drive shaft;

at least one drive wheel rotatable about an axis which is substantially perpendicular to the axis of the drive shaft, said drive wheel being driven from the drive shaft;

means for causing relative motion between said drive wheel and said conveyor roller for engaging and disengaging said drive wheel from driving said conveyor roller;

a drive gear mounted on said drive shaft;

a drive wheel mounting frame on which said drive wheel is mounted; and a driven gear mounted on said drive wheel mounting frame and continuously meshed with said drive gear, said drive wheel being driven from said driven gear.

14. A conveyor as recited in claim 9, and further comprising a bracket mounted on said conveyor frame; said drive wheel mounting frame being mounted on said bracket; and said drive wheel mounting frame being movable relative to said conveyor frame, wherein movement of said drive wheel mounting frame causes relative motion between said conveyor roller and said drive wheel for engaging and disengaging the drive between said drive wheel and said conveyor roller.

15. A conveyor as recited in claim 14, wherein movement of said drive wheel mounting frame causes said drive wheel to move relative to said conveyor roller.

* * * * *